July 2, 1957 L. J. SUDDARTH 2,797,516
UNATTENDED FISHING TACKLE WITH HOOK SETTING MEANS
Filed June 28, 1955 2 Sheets-Sheet 1

Lloyd J. Suddarth
INVENTOR.

BY
Attorneys

July 2, 1957  L. J. SUDDARTH  2,797,516
UNATTENDED FISHING TACKLE WITH HOOK SETTING MEANS
Filed June 28, 1955  2 Sheets-Sheet 2
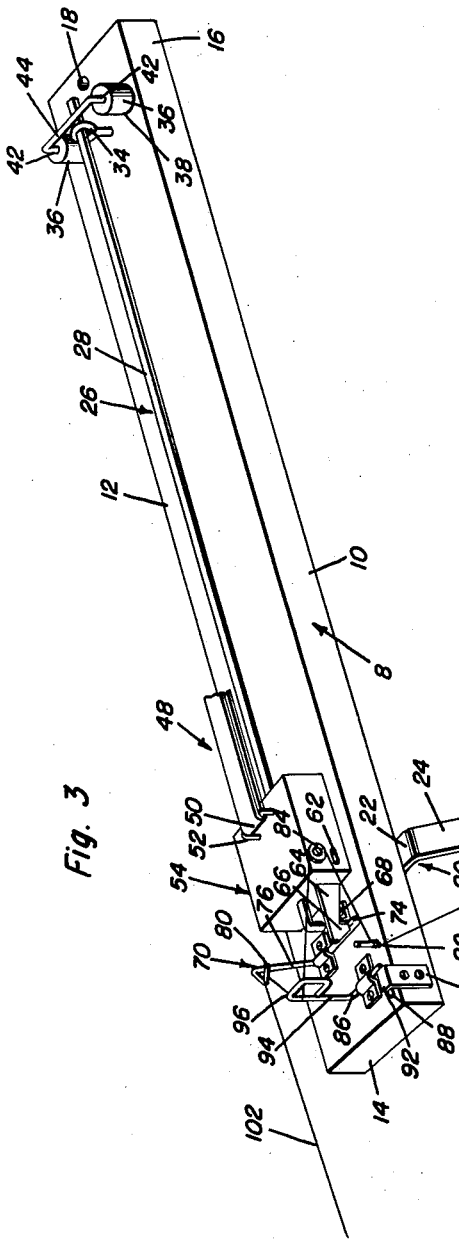
Lloyd J. Suddarth
INVENTOR.

United States Patent Office 2,797,516
Patented July 2, 1957

2,797,516

UNATTENDED FISHING TACKLE WITH HOOK SETTING MEANS

Lloyd J. Suddarth, Noel, Mo.

Application June 28, 1955, Serial No. 518,638

6 Claims. (Cl. 43—15)

The present invention relates to fishing tackle of the unattended type which is brought automatically into operation when a victim-fish strikes the baited line.

More specifically the invention has to do with a casting rod, line and reel, a simple pole and line, a hand-line or any equivalent means through the medium of which a baited hook may be spotted in a body of water and which is weighted to sink to the bottom, or is additionally provided with a bobber or float so that it may be held suspended in the water.

The improved tackle is pull-actuated by the expected fish, trippable action trigger and latch means being employed to cooperate with a properly powered slidable member or slide which acts on the anchored portion of the line to forcibly and automatically jerk the line the instant the fish strikes the baited hook, whereby to set the hook deep in the flesh of the mouth of the fish before the hook can be skillfully disgorged by the fish.

A preferred embodiment of the invention contemplates the use of a portable base having anchoring means at the rearward end and an elevating stand at the forward end. The line jerking and pulling slide is fastened to and slidingly mounted on the base. Elastic means is operatively attached to the base and also to the slide, there being a keeper fixed on said base. A latch is pivotally mounted on and carried by the slide, is aligned with and has a detent releasably engageable with the keeper. A trigger is mounted for operation on said base and it has a latch lifting and releasing cam which is interposed between the base and the detent and is further provided with a pull-actuated trip finger. The fishing line has a first portion releasably attached and temporarily anchored on the base, a second portion operatively attached to said slide, and a third portion releasably attached to said trip finger.

In addition, there is a guide eye mounted on the forward portion of the base adjacent to and cooperating with the keeper bracket, latch and trigger means and which cooperates with a complemental pulley carried by the slide.

Other objects, features and advantages will become more readily apparent from the following description and the accompanying drawings.

In the drawings:

Figure 3 is a perspective view thereof, including the fishing rod and line and showing the manner in which the line is attached in zig-zag fashion in readiness for the expected catch;

Figure 4 is a cross-section on the vertical line 4—4 of Figure 1; and

Figure 5 is an exaggerated fragmentary sectional and elevational view taken approximately on the plane of the irregular line 5—5 of Figure 2.

Figure 1:
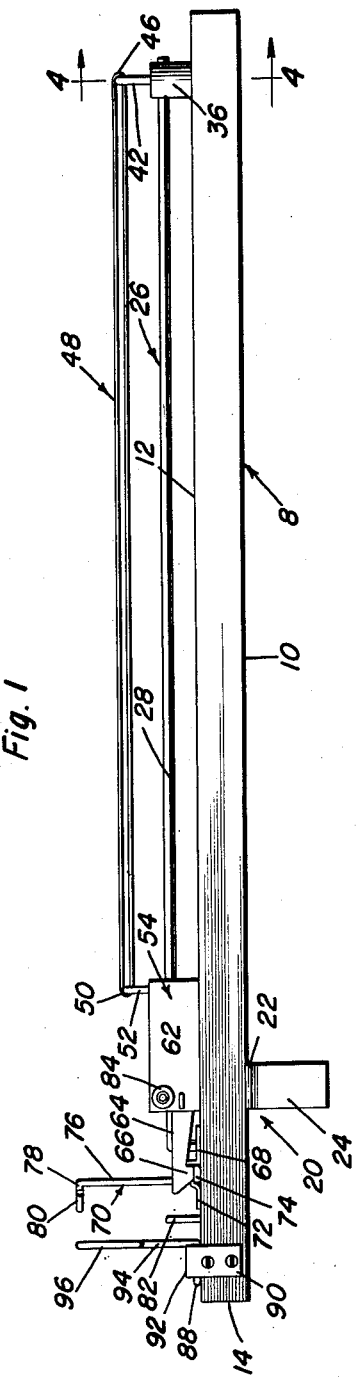
Figure 1 is a side elevation of the improved fishing tackle, not including the fishing line, set for operation.
Figure 2:
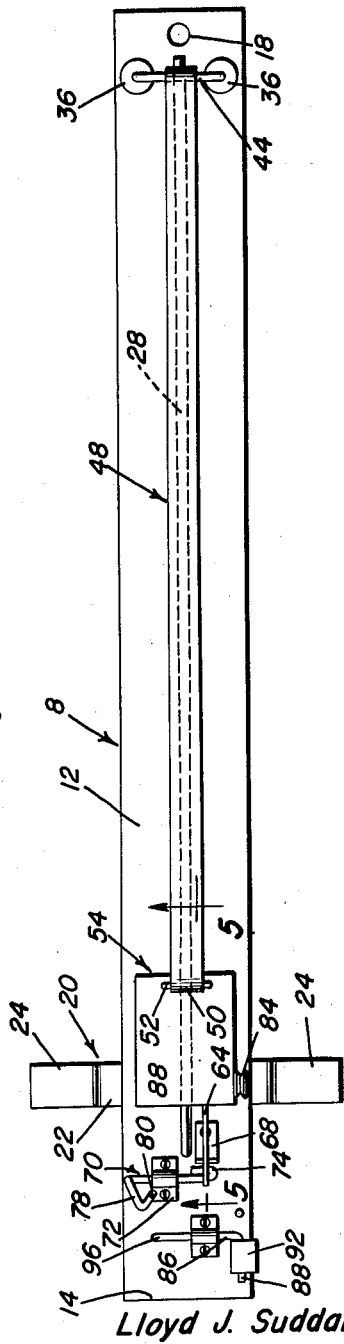
Figure 2 is a top plan view of the same.

Referring now to the drawings the aforementioned base, an elongated or substantially rectangular block of wood or any suitable material, is denoted by the numeral 8. It has a flat bottom 10, flat parallel top 12, a forward end portion 14 and a rearward end portion 16 having a suitable vertical hole 18 to accommodate (not shown) an anchoring rope, chain or the like whereby said base may be handily held in an intended position on the ground, a pier, a boat or elsewhere. Although not absolutely essential the forward end portion is propped up on a stand 20. This is an inverted U-shaped member having its bight portion 22 underlying and fastened to the bottom 10 and having its end portions diverging and depending to provide support legs 24. The guide means herein provided is denoted generally by the numeral 26 and it preferably comprises a rod having a linearly straight substantially intermediate portion 28 which is in spaced parallelism to the intermediate part of the top 12. There is a laterally directed forward end 30 (Fig. 5) which is suitably anchored inwardly of the forward end 14. The other end portion 32 (Fig. 4) is supported in a screw eye 34 which is screwed into the base inwardly of the rearward end. While on this figure and at this end, attention is directed to cushioned stops or bumpers 36 fitted into sockets 38 provided therefor. These rise above the top and are axially provided with sockets 40 to accommodate the depending limbs 42 of a U-shaped staple. The bight of the staple is denoted at 44 and this serves to accommodate an end portion 46 of an endless elastic motive power producing band 48. The other end portion 50 is mounted on the bight portion of a second correspondingly constructed staple 52, this staple being removably mounted in the top of the shiftable slide 54. The slide is preferably in the form of a block and is provided centrally with a bore (Fig. 5) 56 whereby the block is slidably mounted on the guide rod. A recess 58 is provided in the forward end of the block to accommodate a hinging or pivoting pin 60 one end of which extends through one edge of the block and is laterally bent as at 62. This pin serves to attach the vertically liftable and lowerable gravity-held latch 64. The free end of the latch is formed with a nose which provides a detent 66 and when the device is set as shown in the drawings, this detent engages the upstanding end portion of an L-shaped keeper bracket 68 which is fixed on the base to one side of the downturned end 30 of the guide rod.

The aforementioned trippable pull released trigger is denoted generally by the numeral 70. While this may be perhaps described as a crank it is preferably thought of as embodying an oscillatory shaft which is mounted for operation by way of a bearing-equipped clip or fixture 72 on the base. One end of this shaft is provided with a return bend (Fig. 5) 74 which constitutes a cam and this is interposed between the top of the base and the detent 66. When thus positioned the latch detent serves to support the laterally directed arm at the opposite end of the shaft in a vertical position. This arm, denoted at 76, has a horizontal portion 78 with a laterally bent terminal 80 which is oblique angled and provides a trip finger. Attention is next called to a fixed vertical anchor post 82 rising from the base and located in front of and to one side of the latch and bracket means. Then too, it will be seen that 84 designates an idling pulley mounted on the adjacent vertical or marginal edge of the aforementioned slide 54.

The aforementioned line guide at the forward end of the base may be any suitable eye properly located. It is desirable, however, to have it fold down and out of the way under certain carrying and storing conditions. Therefore, it is preferably formed from a length of wire which is fashioned into a crank. The crank has a portion 86 mounted for oscillation in a bearing equipped clip secured to the base and is further provided with a lateral end portion 88 which, when the guide is in use, is situated beneath an L-shaped retainer bracket. A portion 90 of the bracket is fastened to the marginal edge of the base and the overhanging turned in portion 92 overlies the base and arm 88 so as to support the arm portion 94 in the perpendicular position shown. The free end of the wire is fashioned into the guide eye proper which is denoted at 96. As stated a simple guide eye might serve the intended functions of this part. However, the fold-down construction is preferred and to do this it is necessary to shift or slide the guide from right to left in Fig. 3 to disengage the arm 88 from the retainer 92. In any event, when in use, the guide is in the upstanding position shown and is necessarily located in advance of the trigger, latch and keeper bracket. It is also between the anchor post 82 and the trigger 70. The numeral 98 (Fig. 3) designates the fishing rod with a portion 100 of the line mounted thereon. The free end portion 102 of the line extends out into the body of water and is baited and sinker-equipped or otherwise constructed. It will be seen that the line 100 which leads from the rod is wound by appropriate quickly releasable half-hitch loops on the anchor post 82. These half-hitch windings may be readily removed from the post so that the rod may be picked up and brought into play at the desired time. Considering the portions of the line between 100 and 102 it will be seen that the first portion leads from the post and is trained over the idling pulley 84. The second portion is threaded through the upstanding guide eye 96. The next reach or portion is releasably connected with the trip finger 80. The device is now set and ready to operate.

As soon as a strike is made and the attending pull on the line 102 comes into play it will be evident that the trip finger will tilt or swing the trigger 70 forwardly, that is from right to left in Figure 3. This will oscillate the rocker shaft and lift the cam 74 through a limited arc and will exert an upward thrust on the detent 66. This will pivot and releases the latch from the keeper bracket 68. The tensioned slide 54 will now shoot forcibly from left to right in the drawings along the guide rod 28 in an obvious manner under the motive force or tension of the rubber band 48. It will be clear that the functions of the fishing line holder or guide eye 96 are (1) to hold the line at a proper distance in front of the trigger means 70 and (2) to hold and protect the line from injury. The main thing, however, is that the latch released slide jerks the fishing line by way of the pulley 84 from left to right and the resulting jerk-action serves to set the hook in the mouth of the fish to make the catch in the now generally well-known manner.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Fishing tackle of the unattended automatic hook setting type which is triggered into operation when a victim-fish strikes comprising a base having a flat top, an elongate linearly straight rigid rod having its respective forward and rearward end portions fastened to said base and its major intermediate portion disposed in parallelism to and spaced above said top, a block-like slide having a bored portion slidingly mounted on said rod and shiftable back and forth on said rod, stop members mounted atop said base at the rearward end portion of said rod and serving to check and limit the rearward sliding stroke of said slide, an elastic band having one end attached to said base adjacent to said stops and its other end attached to said slide, a freely rotatable line accommodating pulley mounted on said slide, a slide positioning and retaining latch pivotally mounted on and projecting beyond the forward end of said slide, said latch having a gravity-retained detent, a keeper bracket fixed atop said base in line with and forwardly of said slide, said detent being releasably connectible with said keeper bracket, pull actuated means embodying a trigger mounted on said base adjacent to said bracket, said trigger embodying means which serves to lift and release said detent from said keeper bracket under predetermined operating conditions and also having a trip finger, and a fishing line having portions operatively cooperable with said base, pulley and trip finger respectively.

2. Fishing tackle of the unattended automatic hook setting type which is triggered into operation when a victim-fish strikes comprising a base having a flat top, an elongate linearly straight rigid rod having its respective forward and rearward end portions fastened to said base and its major intermediate portion disposed in parallelism to and spaced above said top, a block-like slide having a bored portion slidingly mounted on said rod and shiftable back and forth on said rod, stop members mounted atop said base at the rearward end portion of said rod and serving to check and limit the rearward sliding stroke of said slide, an elastic band having one end attached to said base adjacent to said stops and its other end attached to said slide, a freely rotatable line accommodating pulley mounted on said slide, a slide positioning and retaining latch pivotally mounted on and projecting beyond the forward end of said slide, said latch having a gravity-retained detent, a keeper bracket fixed atop said base in line with and forwardly of said slide, said detent being releasably connectible with said keeper bracket, a trigger having a horizontal rocker shaft mounted for oscillation on said base forwardly of said slide and generally opposite to said keeper bracket, a vertically disposable rocker arm at one end of said shaft, said arm having a horizontal portion paralleling said shaft and terminating in an upstanding oblique-angled trip finger, the other end of said shaft having a return bend defining a cam, said cam being interposed between said base and detent in a manner to lift and release said detent from retentive engagement with said keeper bracket, and a fishing line having portions operatively connected with said base, pulley and trip finger respectively.

3. Fishing tackle of the unattended automatic line jerking and fish hook setting type comprising a base having a screw eye at the rearward end of said base, a rod having one end located and secured in said eye and the other end downwardly bent and secured to said base, a staple straddling said eye and provided with cushioned bumpers, a slide mounted for operation on said rod provided with a removable staple, a replaceable rubber band having its end portions secured releasably to the respective staples, latch means mounted for operation on said slide, a keeper for said latch means fixed on said base, and line actuated guide and trigger means mounted on said base for releasing said latch means.

4. Fishing tackle of the unattended hook setting type which comes automatically into play when a strike is made comprising a portable base having means at its rearward end whereby the base may be anchored in a given position at a desired place of anchorage, means for elevating the forward end of said base, an elongated guide member fixedly mounted atop the central portion of said base, a line jerking slide attached to and longitudinally slidable on said guide member, elastic means operatively attached at one end to said base and at its other end to said slide, a keeper fixed on the forward end portion of said base, a gravity-type latch pivotally mounted on and carried by said slide, aligned with said slide and having a detent releasably connected with said keeper, a trigger pivotally mounted for operation on said forward end portion of the base and having at latch lifting and releasing cam interposed between said base and said detent and also having an elevated line actuated trip finger disposed at an oblique angle relative to the lengthwise center line of said base, said trip finger being located on one side of the center line of said base, said keeper and latch being located on the other side of said center line and rearwardly of said trip finger, a line guide also elevated above the base, located forwardly of the trip finger and keeper and in a position in general alignment with said guide member and slide, a fishing rod separate from said base and having a fishing line associated therewith, a pulley mounted for free rotation on one vertical side of said slide, a line hitching post fixed on said base in alignment with said pulley, spaced forwardly of the pulley and trip finger and rearwardly of said line guide, and said fishing line having a first portion releasably hitched to said post, a second portion trained over said pulley, a third portion passing through said line guide toward said trip finger, and a fourth portion releasably connected with said trip finger.

5. The structure defined in claim 2, and the combination of a hingedly mounted folding line guide on said base forwardly of said keeper bracket and situated beyond said bracket and trigger, and a line anchoring post also fixed atop said base and located forwardly on said keeper bracket and in alignment with said pulley, and a portion of said line being releasably hitched to said anchoring post and an adjacent portion of the line being threaded through said line guide.

6. Fishing tackle of the unattended automatic hook setting type which is triggered into operation when a victim-fish strikes, comprising a base, an elongate linearly straight rigid rod having its respective forward and rearward end portions fastened to said base and its major intermediate portion disposed in parallelism to and spaced above said base, a slide mounted on said rod and shiftable back and forth on said rod, stop members mounted atop said base at the rearward end portion of said rod and serving to check and limit the rearward sliding stroke of said slide, an elastic band having one end attached to said base and its other end attached to said slide, a freely rotatable line accommodating pulley mounted on said slide, a slide positioning and retaining latch pivotally mounted on and projecting beyond the forward end of said slide, said latch having a gravity-retained detent, a keeper bracket fixed atop said base in line with and forwardly of said slide, said detent being releasably connectible with said keeper bracket, a trigger having a horizontal rocker shaft mounted for oscillation on said base forwardly of said slide and generally opposite to said keeper bracket, a vertically disposable rocker arm at one end of said shaft, said arm having a horizontal portion paralleling said shaft and terminating in an upstanding oblique-angled trip finger, the other end of said shaft having a cam interposed between said base and detent in a manner to lift and release said detent from retentive engagement with said keeper bracket.

References Cited in the file of this patent

UNITED STATES PATENTS

| | | |
|---|---|---|
| 671,914 | Nesbit | Apr. 9, 1901 |
| 840,598 | Tuttle | Jan. 8, 1907 |
| 1,934,536 | Hawkinson | Nov. 7, 1933 |
| 2,657,493 | Coles | Nov. 3, 1953 |

FOREIGN PATENTS

| | | |
|---|---|---|
| 952,739 | France | Nov. 3, 1949 |